United States Patent

[11] 3,580,990

[72] Inventor Toshihiko Numakura
Tokyo, Japan

[21] Appl. No. 775,277
[22] Filed Nov. 13, 1968
[45] Patented May 25, 1971
[73] Assignee Sony Corporation
Tokyo, Japan
[32] Priority Nov. 13, 1967
[33] Japan
[31] 42/72736

[54] RECORDING AND REPRODUCING SYSTEM FOR COLOR VIDEO SIGNALS

22 Claims, 3 Drawing Figs.

[52] U.S. Cl. .......... 178/5.2, 178/6.6
[51] Int. Cl. .......... H04n 9/32
[50] Field of Search .......... 178/6.6 (A), 5.2, 5.4 (CR)

[56] References Cited
UNITED STATES PATENTS
3,381,083 4/1968 Jensen et al. .......... 178/6.6A
3,359,364 12/1967 Kihara .......... 178/6.6A

*Primary Examiner*—Richard Murray
*Assistant Examiner*—Barry Leibowitz
*Attorneys*—Albert C. Johnston, Robert E. Isner, Lewis H. Eslinger and Alvin Sinderbrand

ABSTRACT: In recording a composite color video signal consisting of a luminance signal and a modulated chrominance signal having its frequency band contained within the luminance signal band, a carrier is frequency modulated with the luminance signal separated from the composite signal, the modulated chrominance signal separated from the composite original is frequency converted to have a frequency band juxtaposed to the lower limit of the bandwidth of the frequency-modulated luminance signal, and the latter is combined with the thus converted chrominance signal and with a pilot signal having a still lower bandwidth to provide a combined signal which is magnetically recorded. Upon magnetic reproduction of the combined signal thus recorded, the pilot signal, frequency-modulated luminance signal and converted chrominance signal are separately extracted from the reproduced signal, amplitude variations of the pilot signal are detected to control the amplitude of the converted chrominance signal which is reconverted to substantially its original frequency band by reference to the pilot signal, and the frequency-modulated luminance signal is demodulated and combined with the reconverted modulated chrominance signal to provide the composite color video signal.

2 Sheets-Sheet 1

INVENTOR.
TOSHIHIKO NUMAKURA
BY
[signature]
ATTORNEY.

Patented May 25, 1971 3,580,990

2 Sheets-Sheet 2

INVENTOR.
TOSHIHIKO NUMAKURA
BY
[signature]
ATTORNEY.

RECORDING AND REPRODUCING SYSTEM FOR COLOR VIDEO SIGNALS

The invention relates generally to a system for recording and reproducing a video signal and, more particularly, it is directed to improvements in the recording and reproduction of a color video signal.

The color video signals for transmission in the United States have been standardized by the (NTSC) as composite color signals consisting of a luminance signal and a modulated chrominance signal comprised of subcarriers having a standard frequency of about 3.58 mc. and being 90° out of phase and which are respectively modulated with I and Q chrominance signals. In such composite color signals, the frequency band of the chrominance signal is within that of the luminance signal.

Conventional systems for recording and reproducing this composite signal have generally frequency modulated a carrier wave directly with the composite signal and the resulting frequency modulated signal is thereafter magnetically recorded and reproduced.

These conventional systems, however, experience a great number of problems which tend to diminish the color fidelity and stability of color television pictures reproduced thereby. Due to the normal limitations in mechanical accuracy of magnetic recording and reproducing apparatus and the transmission characteristic of the circuits incorporated therein, there often occurs a disagreement in the hue of chrominance signals.

In addition, the prior art systems may experience beat interference between the various signals due to nonlinearity of the transmission system.

Also, in conventional systems, the chrominance signal response may fade or may be caused to change, depending on the luminance signal level due to the close proximity of the respective frequency bands.

Further, the use of a relatively high frequency band for the chrominance signal creates or allows distortion from the influence of phase variation (jitter) or from external noise or other interference.

Accordingly, an object of this invention is to provide a system for recording and reproducing color video signals wherein the reproduced signals are relatively free from phase and response variations of the chrominance signals.

Another object is to provide a system for recording and reproducing color video signals wherein the modulated chrominance band, as recorded, is relocated outside the frequency-modulated luminance signal band so that the response and phase of the chrominance signal are relatively free from variations caused by any changes in the luminance signal level.

Still another object of this invention is to provide a system for recording and reproducing color video signals wherein the modulated chrominance signal, as recorded, is relocated in a relatively low frequency band so that influence of phase variation (jitter) is greatly reduced.

A still further object is to provide a system for recording and reproducing a color video signal wherein the luminance signal, which is frequency modulated, and the modulated chrominance signal are recorded and reproduced with their frequency bands substantially separated from each other in order to prevent beat interference due to nonlinearity.

It is yet another object of the present invention to provide a system in which a pilot signal is included in the combined signal which is recorded and reproduced magnetically and is employed to eliminate phase variation in the reproduced modulated chrominance signal in order to produce a picture with fidelity in terms of hue even during production of a still or slow-motion picture.

Still another object is to provide a system having the foregoing characteristics, and in which amplitude variations of the reproduced pilot signal are detected and employed to automatically control the amplitude of the reproduced chrominance signal.

In accordance with this invention, the luminance signal of a composite color video signal is frequency modulated and the modulated chrominance signal of the composite signal has its frequency band shifted so as to be substantially below the lower limit of the frequency band of the frequency-modulated luminance signal, whereupon the frequency-modulated luminance signal is combined with the frequency-shifted or converted chrominance signal and with a pilot signal at a frequency below the frequency band of the latter to constitute a combined signal which is magnetically recorded. When the recorded combined signal is magnetically reproduced, the frequency-modulated luminance signal, frequency-converted chrominance signal and pilot signal are extracted therefrom, whereupon, the extracted luminance signal is demodulated, the frequency-converted chrominance signal is amplitude controlled on the basis of detected variations in the amplitude of the separated pilot signal, the frequency-converted chrominance signal has its frequency band returned to substantially its original limits at least partly on the basis of the pilot signal, and the resulting modulated chrominance signal is combined with the demodulated luminance signal to reconstitute the composite color video signal.

A fuller appreciation of the above, and other objects, features and advantages of the invention, may be gained from the following description of illustrative embodiments which is to be read in connection with the accompanying drawings, wherein.

Figure 1:
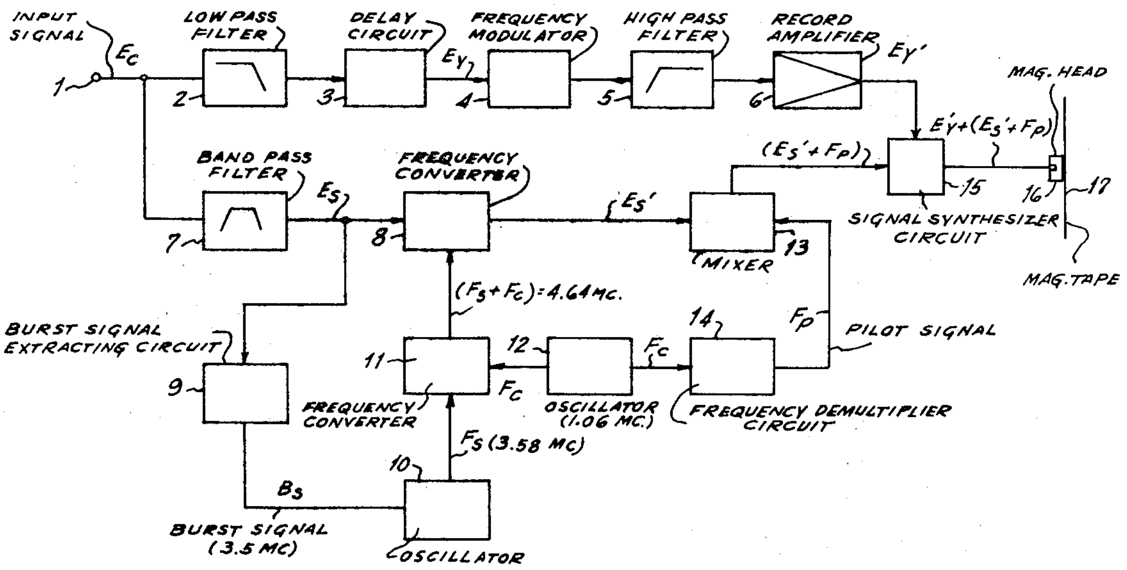
FIG. 1 is a block diagram showing a portion of the system according to the invention for magnetically recording color video signals.
Figure 3:
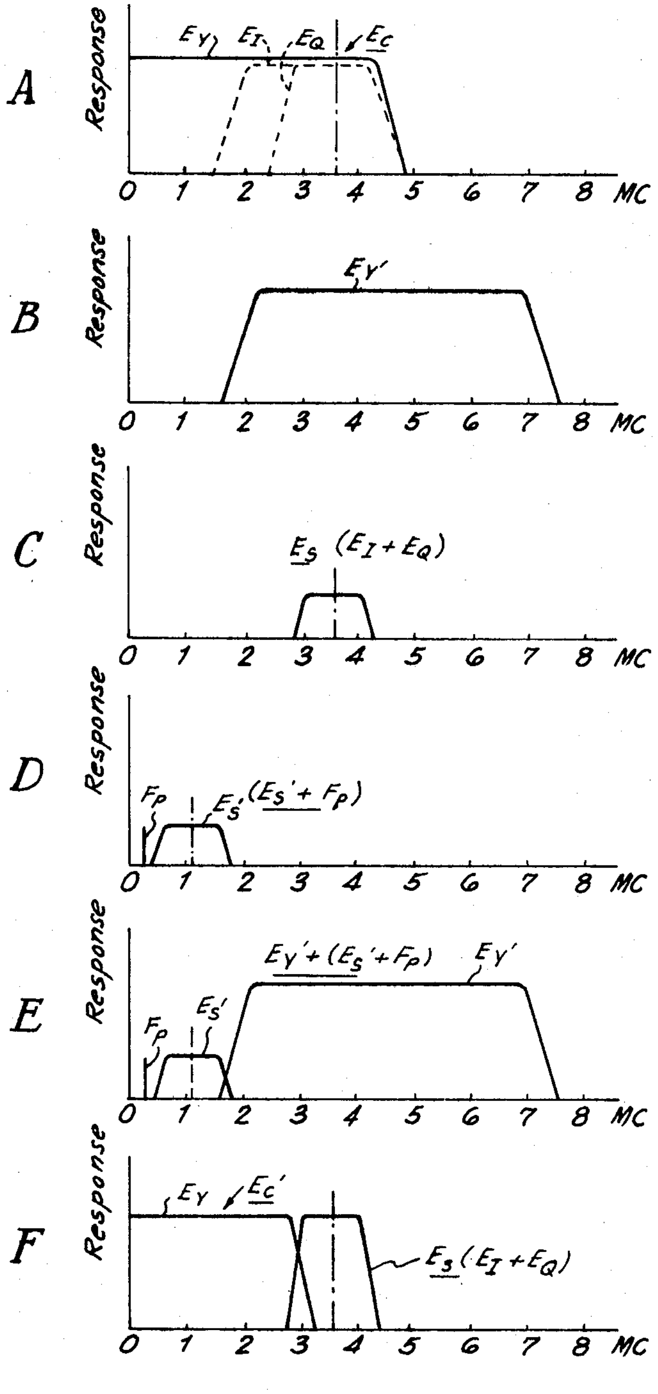
FIG. 3 is a series of diagrams showing various frequency spectra in the illustrated system.

Referring to FIG. 1 of the drawings, it will be seen that an input terminal 1 is provided to receive an input signal which is to be magnetically recorded and reproduced. Although the system of the present invention is applicable to various input signals, the preferred embodiment as hereinafter described is presented as utilizing a NTSC system composite color television signal $E_C$. Such composite signal $E_C$ consists of a luminance signal $E_Y$ and a modulated chrominance signal $(E_I+E_Q)$ made up of color subcarriers of approximately 3.58 mc. which are modulated with I and Q and are 90° out of phase with each other. As shown in FIG. 3A, the frequency bands of signals $E_I$ and $E_Q$ are included in the frequency band of the $E_Y$ signal.

In the system according to this invention, means are provided to frequency modulate the carrier wave with the luminance signal $E_Y$ and, as shown, such means may include a low-pass filter 2 of about 3 mc., a delay circuit 3 and a frequency modulator 4 which modulates the carrier wave with the $E_Y$ signal so that, for example, the tip level of the synchronizing signal may correspond to about 4.5 mc. and the white peak level to about 6 mc. The resulting frequency-modulated signal $E_Y$ is then supplied through a high pass filter 5 to a record amplifier 6. The record amplifier 6 amplifies the frequency-modulated signal $E_Y$ to signal $E_Y$ as shown in FIG. 3B, having a frequency bandwidth from about 2 mc. to 7 mc.

The modulated chrominance signal $E_S$ is extracted from the composite signal $E_C$ by a band-pass filter 7 and has a bandwidth of ±0.6 mc. with the center of the frequency band being 3.58 mc. as shown in FIG. 3C. The signal $E_S$ thus separated is supplied to a frequency converter 8 which may be constructed in the form of a balanced modulator. Further, part of the extracted modulated chrominance signal $E_S$ is supplied to a burst signal extracting circuit 9 so that a burst signal $B_S$ of 3.58 mc. is obtained. This burst signal $B_S$ is supplied to a 3.58 mc. crystal oscillator 10 generating a first frequency signal $F_S$ which is locked to the burst signal frequency.

The first frequency signal $F_S$ from oscillator 10 is supplied to a frequency converter 11 to which is also supplied a second frequency signal $F_C$. This second frequency $F_C$ has a fixed lower frequency, for example, about 1.06 mc., and is provided by means such as crystal oscillator 12. Frequency converter 11 produces a third frequency signal $(F_S+F_C)$ having a frequency which is the result and, in the example being described, the sum of the frequencies $f_s$ and $f_c$ of the signals $F_C$ and $F_S$. Thus, the resultant third frequency signal $(F_C+F_S)$ has a frequency of 4.64 mc. and is supplied to frequency converter 8.

The third frequency signal $(F_C+F_S)$ acts in frequency converter 8 to beat down the frequency band of the modulated chrominance signal $E_S$ so that the frequency-converted chrominance signal $E_S'$ that issues from converter 8 will have a bandwidth of about ±0.6 mc. with its center shifted to about 1.06 mc., that is, the difference between the subcarrier frequency (3.58 mc.) of chrominance signal $E_S$ and the frequency of $(F_C+F_S)$. The frequency converted chrominance signal $E_S'$ is supplied to a mixer 13.

The second frequency signal $F_C$ of 1.06 mc. is also supplied from oscillator 12 to a frequency demultiplier circuit 14 adapted to provide a pilot signal $F_p$ at a frequency, for example, of 1.06/3 mc., which is below the lower limit of the frequency band of the modulated chrominance signal $E_s'$, as shown in FIG. 3D. The pilot signal $F_p$ is also supplied to mixer 13 so as to obtain from the latter a signal $(E_S'+F_p)$.

Then, the signal $(E_S'+F_P)$ and the signal $E_Y'$ provided by record amplifier 6 are supplied to a signal synthesizer circuit 15 in order to produce a combined signal $(E_Y'+(E_S'+F_P))$ in which the frequency band of the frequency-converted chrominance signal $E_S'$ is juxtaposed to the lower limit of the frequency band of the frequency-modulated luminance signal $E_Y'$ at most only in partly overlapping relationship therewith and the frequency of pilot signal $F_p$ is located below the lower limit of the band of signal $E_S'$, as shown in FIG. 3E. The combined signal $(E_Y'+(E_S'+F_P))$ thus produced is recorded on a magnetic tape 17 by means of a magnetic head 16.

From the foregoing, the recording section of the system according to an embodiment of the present invention will be apparent. However, further description will be made of the preferred relationship between the frequency $f_s$ of the first frequency signal $F_S$ and the frequencies $f_c$ and $f_p$ of the second frequency signal $F_C$ and pilot signal $F_P$.

The frequency $f_s$ is preferably the same as the frequency of the color subcarriers for the modulated chrominance signal $E_S$ included in the composite input signal $E_C$. The frequency of the color subcarriers is selected to be an odd multiple of one-half the horizontal scanning frequency $f_h$ and, in the standard NTSC composite signal is $½f_h×455$ which equals 3.579545 mc. so that the frequency spectra of the color subcarriers will be located in interpolated relation to the frequency spectra of the luminance signal $E_Y$ of the composite signal $E_C$. Thus, in the case of a system for recoding and reproducing the standard NTSC composite color video signal, the frequency $f$ is preferably 3.579545 mc. (which has been simplified herein as 3.58 mc.).

The frequency $f_c$ is preferably substantially lower than the frequency $f_s$ and is also selected to be an odd multiple of $½f_H$ so as to be determined by the frequency interpolating method. Hence, $f_c=½_H×(2n-1)$, where $n$ is an integer.

In the example described, the integer $n$ was selected to be 68 to make $f_c$=1.06 mc. which is sufficiently lower than $f_s$. In selecting such integer attention was given to the avoidance of beat interference between higher harmonic components having great energy, such as the first order and a second order high harmonics of $f_c$ and the frequency of the color subcarriers of chrominance signal $E_S$. Further, by selecting $f_c$, as above, the frequency band of frequency-converted chrominance signal $E_S$ is sufficiently depressed to prevent the frequency band of the frequency-converted chrominance signal $E_S'$ from being affected by phase variations occurring in the recording system.

The frequencies $f_c$ and $f_s$ need not be interlocked with each other, as the relationship between the frequency $f_p$ and the frequency of the luminance signal can easily be made close to a frequency-interpolated relationship. If the frequency $f_c$ was to be interlocked with the frequency $f_s$, the burst signal $B_S$ could be supplied to a signal generator (not shown) adapted to provide a frequency signal having a frequency equal to a common multiple of $f_s$ and $f_c$, and that frequency signal or a demultiplied frequency signal obtained therefrom, could be supplied to the oscillator 12. However, the foregoing requires a complicated arrangement, and such synchronous locking is not effective. Rather, the frequency $f_p$ is determined from its interrelationship to the frequency $f_c$, but it is not necessarily so selected as to intentionally achieve a frequency-interpolated relationship between the frequencies $f_p$ and $f_c$ in respect of their spectrum. The frequency $f_p$ can easily be obtained from the frequency $f_c$ merely by demultiplying the latter, and it can be located substantially in frequency-interpolated relationship to the frequency $f_c$. Thus, the frequency $f_p$ is given by $f_p=f_c/m$ where $m$ is an integer. To make $f_p$ sufficiently lower than $f_c$, $m$ may be selected to be 3, for example, which results in $f_p$=1 .06/3. By given such a low value to frequency $f_p$, the pilot signal $F_P$ is relatively free from phase variations (jitter) occurring in the recording system.

The signal $(E_Y'+(E_S'+F_P))$ to be supplied to the magnetic head 16 is preferably provided with level difference between $E_Y'$ and $E_S'$ so that the level ratio of $E_Y'$ to $E_S'$ becomes 1:0.1 0.03 on the basis of the recording current flowing through the magnetic head 16. That is, the level ratio of signal $E_S'$ is from about 3 to 10 percent of the lever ratio of $E_Y'$. Furthermore, the level ratios of $E_S'$ and $F_P$ are selected so that the level of $E_S'$ is at least as large as that of $F_P$. In practice, therefore, it is possible to supply signal $(E_s'+F_p)$ directly to synthesizer circuit 15 while only signal $E_y'$ is supplied to the latter through amplifier 6. Furthermore, the circuit 15 may be constituted merely by connections of the output terminals of amplifier 6 with the output terminals of mixer 13. One reason why $E_Y'$ and $E_S'$ are provided with different levels, as described, is that $F_P$ and $E_S'$ are simultaneously recorded and reproduced with relatively great amplitudes under the high frequency biasing action produced by $E_Y'$ since the frequencies of $F_P$ and $E_S'$ are low. Another reason is that, even if cross-modulation occurs among $E_Y'$, $E_S'$ and $F_P$, the amplitude of any signals resulting from such cross-modulation is sufficiently low and the cross-modulation components can easily be removed from signal $E_Y'$ by means of a limiter.

Figure 2:
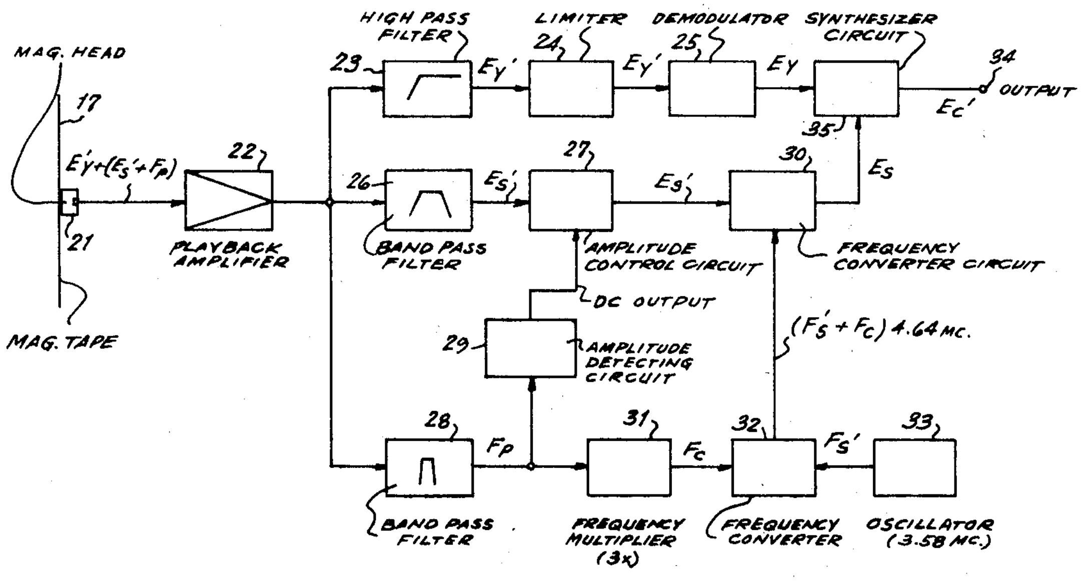
FIG. 2 is a block diagram showing a portion of the system according to the invention for reproducing color video signals recorded by the arrangement of FIG. 1.

Referring now to FIG. 2, it will be seen that the combined signal $(E_Y'+(E_S'+F_P))$ described above in connection with FIG. 3E and which has been recorded on tape 17 may be reproduced by a magnetic head 21 disposed in contact with the tape. The combined signal thus reproduced is supplied to a playback amplifier 22, and thence through a high pass filter 23 to a limiter 24 in which signal $E_Y'$, as shown in FIG. 3B, is reproduced. The high frequency response is dropped or partly cut off if limitation is imposed upon the high frequency transmission characteristics of the magnetic tape and magnetic head. Then signal $E_Y'$ is supplied to a signal demodulator 25 from which is obtained a luminance signal $E_Y$, having a frequency band as shown in FIG. 3F, and which is in turn supplied to a synthesizer circuit 35. A part of the signal $E_Y'+(E_S'+F_p))$ provided by the playback amplifier 22 is supplied to a band-pass filter 26 so that a modulated chrominance signal $E_S'$, such as shown in FIG. 3D, is obtained therefrom for feeding to an amplitude control circuit 27. Also, a part of the reproduced signal $(E_Y'+(E_S'+F_P))$ is supplied to a band-pass filter 28 from which the pilot signal $F_P$ is obtained. The pilot signal $F_P$ is supplied to an amplitude-detecting circuit 29 adapted to detect variations in the amplitude of the pilot frequency $F_P$ and to provide a DC output which varies in accordance with changes in the amplitude of $F_P$ and is supplied to amplitude-controlling circuit 27 for causing the latter to automatically control the amplitude of signal $E_S'$.

The amplitude-controlled signal $E_S'$ available from control circuit 27 is then supplied to a frequency converter 30. The pilot signal $F_P$ is also supplied to a frequency multiplier 31 so that there is obtained a frequency signal $F_C$ having a frequency $f_c$ (1.06 mc.) which is three times as high as the frequency $f_P$ (1.06/3 mc.) of pilot signal $F_P$. That frequency signal $F_C$ is supplied to a frequency converter 32 which also receives a frequency signal $F_S'$ from a crystal oscillator 33 having a frequency of 3.58 mc. or $f_s$. The converter 32 provides a frequency signal $(F_S'+F_C)$ having a frequency $(f_s+f_c)=4.64$ mc., and which is in turn supplied to frequency converter circuit 30 so that the latter shifts the frequency band of signal $E_S'$ substantially back to that of chrominance signal $E_S$ shown on FIG. 3C, and such modulated chrominance signal $E_S$ is also supplied to the synthesizer circuit 35.

Consequently, a reconstituted composite color video signal $E_C'$, as shown on FIG. 3F, and which generally corresponds to the composite signal $E_C$ of FIG. 3A, is obtained at an output terminal 34 of synthesizer circuit 35.

Even if the phases of C signal $F_P$ and modulated chrominance signal $E_S'$ are changed in the described magnetic recording and reproducing system, such phase variations are substantially equal to each other since both of these signals are magnetically recorded and reproduced while being maintained in relatively low frequency bands. Consequently, any phase variation of the signal $F_C$ provided by frequency multiplier circuit 31 is accompanied by a substantially equal phase variation of the signal $E_S'$. The phase variation of the signal $(F_S'+F_C)$ and that of the signal $E_S'$ are also equal to each other since the frequency $f_s$ of the signal $F_S'$ is fixed. Thus, the signal $E_S$ provided by the frequency converter circuit 30 is a modulated chrominance signal having color subcarriers with a fixed frequency of $f_s$ which is substantially free from phase variation. Consequently, the reproduced composite signal $E_C'$ contains the modulated chrominance signal $E_S$ free from phase variation, and can produce a color picture which is free from disagreement of hue.

Furthermore, since the amplitude of chrominance signal $E_S'$ is automatically controlled in accordance with variation in the amplitude of pilot signal $F_P$, amplitude variation of the chrominance signal $E_S$ can be minimized, whereby to improve the fidelity of the resulting composite color video signal $E_C'$ in terms of saturation degree. In the example given, the bandwidths of the I and Q signals $E_I$ and $E_Q$ contained in the reproduced composite color video signal $E_C'$ are somewhat narrower than those of the original composite signal $E_C$, but this is substantially not critical. However, if any problem arises therefrom, it is only necessary to shift the frequency band of the frequency-modulated luminance signal $E_Y'$ to a higher frequency position to expand the frequency band between the signal $E_Y'$ and the pilot signal $F_P$ so that the frequency-converted chrominance signal $E_S'$ may be located within the thus expanded frequency band, taking into consideration the characteristics of the magnetic tape and magnetic head.

As compared with the conventional system wherein a carrier is frequency modulated directly with the composite color video signal and the frequency-modulated signal is magnetically recorded, the above-described system according to this invention will be seen to have the following advantages and features:

1. In the system in accordance with the invention, the frequency-modulated luminance signal and the modulated chrominance signal are transmitted with their frequency bands substantially separated from each other, so that no beat interference can occur due to the nonlinearity of the transmission system as in the conventional systems. Therefore, complicated and expensive circuit arrangements to cope with such beat interference are not needed.

2. In the conventional systems, the chrominance signal response and phase tend to be easily changed depending upon the luminance signal level, while, in the system in accordance with the invention, the modulated chrominance signal band is located substantially outside the frequency-modulated luminance signal band so that such response and phase variations are not encountered, whereby improved fidelity in terms of color saturation degree and hue is achieved.

3. In the system in accordance with the invention, the frequency-modulated luminance signal serves as a high frequency bias for the modulated chrominance signal and pilot signal, so that the latter two signals can be reproduced with improved linearity. Thus, the fidelity of reproduction of the color saturation degree is further enhanced.

4. In the system in accordance with the invention, the modulated chrominance signal is located in a relatively low frequency band, so that the influence of phase variation (jitter) can be greatly reduced, as compared with the conventional systems.

5. In the systems in accordance with the invention, the inclusion of the pilot signal in the recorded signal makes it possible, upon reproduction, to eliminate any phase variation of the modulated chrominance signal without interruption. Thus, it is possible to produce a picture with high fidelity in terms of hue, particularly when producing a still or slow-motion picture.

6. In the system in accordance with the invention, the frequency of the pilot signal is so low that it is rarely affected by external noise. Therefore, phase variation of the modulated chrominance signal is also rarely influenced by such external noise.

In the above-described embodiment of the invention, the input signal to the recording and reproducing system has been assumed to be of the standard NTSC type in which the modulated chrominance signal is obtained by modulating with I and Q signals color subcarriers that are 90° out of phase with each other. However, it is apparent that the input to the system according to the invention is not limited to such NTSC-type composite signal, but may be a color video signal of the so-called PAL type, in which the phases of the color subcarriers are line-sequentially inverted through 180°.

Further, although the above-described embodiment of the invention actually records and reproduces the combined signal $[E_Y'+(E_S'+F_P)]$ by means of particular magnetic recording and reproducing devices, that is, magnetic heads 16 and 21 engageable with tape 17, it is to be understood that such combined signal $[E_Y'+(E_s'+F_p)]$ may be recorded and reproduced by any other existing devices adopted therefor.

Having described a particular embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

I claim:

1. A system for recording and reproducing a composite color video signal consisting of a luminance signal and a modulated chrominance signal having its frequency band within that of the luminance signal, comprising means for extracting said luminance and chrominance signals from said composite signal, means for frequency modulating said luminance signal, means for frequency converting said chrominance signal to a frequency band juxtaposed to the lower limit of the frequency bandwidth of the frequency-modulated luminance signal, means for producing a pilot signal with a frequency band lower than that of the frequency-converted chrominance signal, means for combining said frequency-modulated luminance signal with said frequency-converted chrominance signal and said pilot signal to provide a single combined signal, means for magnetically recording said combined signal and for magnetically reproducing the same, means for extracting said frequency-modulated luminance signal, said frequency-converted chrominance signal and said pilot signal from the reproduced combined signal, means for demodulating the extracted frequency-modulated luminance signal, means responsive to variations in the amplitude of the extracted pilot signal to control the amplitude of the extracted frequency-converted chrominance signal, means receiving the extracted pilot signal to reconvert the amplitude-controlled chrominance signal to substantially its original frequency band and means combining the demodulated luminance signal with the reconverted chrominance signal so as to reconstitute the composite color video signal therefrom.

2. A system for recording and reproducing a composite color video signal consisting of a luminance signal and a modulated chrominance signal having its frequency band within that of the luminance signal, comprising means for extracting said luminance and chrominance signals from said composite signal, means for frequency modulating said luminance signal, means for frequency converting said chrominance signal to a frequency band juxtaposed to the lower limit of the frequency bandwidth of the frequency-modulated luminance signal, said means for frequency converting the chrominance signal extracted from the composite color video signal including means extracting a burst signal from said chrominance signal, first oscillator means locked by said burst signal to produce a first frequency signal at a frequency which is an odd multiple of one-half the horizontal scanning frequency, second oscillator means producing a second frequency signal at a frequency which is also an odd multiple of one-half said horizontal scanning frequency, means combining said first and second frequency signals to provide a third frequency signal at a frequency which is the result of the frequencies of said first and second signals and means to beat down said modulated chrominance signal extracted from the composite color video signal with said third frequency signal, means for producing a pilot signal with a frequency band lower than that of the frequency-converted chrominance signal, means for combining said frequency-modulated luminance signal with said frequency-converted chrominance signal and said pilot signal to provide a combined signal, means for magnetically recording said combined signal and for magnetically reproducing the same, means for extracting said frequency-modulated luminance signal, said frequency-converted chrominance signal and said pilot signal from the reproduced combined signal, means for demodulating the extracted frequency-modulated luminance signal, means responsive to variations in the amplitude of the extracted pilot signal to control the amplitude of the extracted frequency-converted chrominance signal, means receiving the extracted pilot signal to reconvert the amplitude-controlled chrominance signal to substantially its original frequency band, and means combining the demodulated luminance signal with the reconverted chrominance signal so as to reconstitute the composite color video signal therefrom.

3. A system according to claim 2, in which said third frequency signal has a frequency which is the sum of said frequencies of the first and second frequency signals.

4. A system according to claim 3, in which said first frequency signal has a frequency substantially equal to that of subcarriers of said chrominance signal and said second frequency signal has a frequency substantially lower than said frequency of the first frequency signal.

5. A system according to claim 4, in which said means producing a pilot signal is constituted by means demultiplying said second frequency signal.

6. A system according to claim 2, in which, in said combined signal which is magnetically recorded, said frequency-converted chrominance signal has a level which is about 3 to 10 percent of the level of said frequency-modulated luminance signal.

7. A system according to claim 6, in which said level of said frequency-converted chrominance signal is at least as large as the level of said pilot signal in said combined signal.

8. A system according to claim 2, in which said means to reconvert the amplitude-controlled chrominance signal to substantially its original frequency band includes frequency multiplier means acting on said extracted pilot signal to provide a fourth frequency signal equal in frequency to said second frequency signal, means generating a fifth frequency signal equal in frequency to said first frequency signal, means combining said fourth and fifth frequency signals to provide a sixth frequency signal equal in frequency to said third frequency signal, and frequency converting means employing said sixth frequency signal to shift the frequency band of said amplitude-controlled chrominance signal to said original frequency band.

9. A system for recording a composite color video signal consisting of a luminance signal and a modulated chrominance signal having its frequency band within that of the luminance signal, comprising means for extracting said luminance and chrominance signals from said composite signal, means for frequency modulating said luminance signal, means for frequency converting said chrominance signal to a frequency band juxtaposed to the lower limit of the frequency bandwidth of the frequency-modulated luminance signal, means for producing a pilot signal with a frequency band lower than that of the frequency-converted chrominance signal, means for combining said frequency-modulated luminance signal with said frequency-converted chrominance signal and said pilot signal to provide a single combined signal, means for magnetically recording said combined signal.

10. A system for recording a composite color video signal consisting of first luminance signal and a modulated chrominance signal having its frequency band within that of the luminance signal, comprising means for extracting said luminance and chrominance signals from said composite signal, means for frequency modulating said luminance signal, means for frequency converting said chrominance signal to a frequency band juxtaposed to the lower limit of the frequency bandwidth of the frequency-modulated luminance signal, said means for frequency converting the chrominance signal extracted from the composite color video signal including means extracting a burst signal from said chrominance signal, first oscillator means locked by said first signal to produce a first frequency signal at a frequency which is an odd multiple of one-half the horizontal scanning frequency, second oscillator means producing a second frequency signal at a frequency which is also an odd multiple of one-half said horizontal scanning frequency, means combining said first and second frequency signals to provide a third frequency signal at a frequency which is the result of the frequencies of said first and second signals and means to beat down said modulated chrominance signal extracted from the composite color video signal with said third frequency signal, means for producing a pilot signal with a frequency band lower than that of the frequency-converted chrominance signal, means for combining said frequency-modulated luminance signal with said frequency-converted chrominance signal and said pilot signal to provide a combined signal, and means for magnetically recording said combined signal.

11. A system according to claim 10, in which said third frequency signal has a frequency which is the sum of said frequencies of the first and second frequency signals.

12. A system according to claim 11, in which said first frequency signal has a frequency substantially equal to that of the subcarriers of said chrominance signal and said second frequency signal has a frequency substantially lower than said frequency of the first frequency signal.

13. A system according to claim 12, in which said means producing a pilot signal is constituted by means demultiplying said second frequency signal.

14. A system according to claim 10, in which, in said combined signal which is magnetically recorded, said frequency-converted chrominance signal has a level which is about 3 to 10 percent of the level of said frequency-modulated luminance signal.

15. A system according to claim 14, in which said level of said frequency-converted chrominance signal is at least as large as the level of said pilot signal in said combined signal.

16. A system for reproducing a composite color video signal consisting of a luminance signal and a modulated chrominance signal from a magnetically recorded combined signal consisting of a carrier frequency modulated with the luminance signal, the modulated chrominance signal having its frequency band converted so as to be juxtaposed to the lower limit of the bandwidth of the frequency-modulated luminance signal and a pilot signal having a frequency band below that of the frequencyeconverted chrominance signal, comprising means for magnetically reproducing said recorded combined signal, means for extracting said frequency-modulated luminance signal, said frequency-converted chrominance signal and said pilot signal from the reproduced combined signal, means for demodulating the extracted frequency-modulated luminance signal, means responsive to variations in the amplitude of the extracted pilot signal to control the amplitude of the extracted frequency-converted chrominance signal, means receiving the extracted pilot signal to reconvert the amplitude-controlled chrominance signal to substantially its original frequency band and means combining the demodulated luminance signal with the reconverted chrominance signal so as to reconstitute the composite color video signal therefrom.

17. A system for reproducing a composite color video signal consisting of a luminance signal and a modulated chrominance signal from a magnetically recorded combined signal consisting consisting of a carrier frequency modulated with the luminance signal, the modulated chrominance signal having its frequency band converted so as to be juxtaposed to the lower limit of the bandwidth of the frequency-modulated luminance signal and a pilot signal having a frequency band below that of the frequency-converted chrominance signal, comprising means for magnetically reproducing said recorded combined signal, means for extracting said frequency-modulated luminance signal, said frequency-converted chrominance signal and said pilot signal from the reproduced combined signal, means for demodulating the extracted frequency-modulated luminance signal, means responsive to variations in the amplitude of the extracted pilot signal to control the amplitude of the extracted frequency-converted chrominance signal, means receiving the extracted pilot signal to reconvert the amplitude-controlled chrominance signal to substantially its original frequency band, said means to reconvert the amplitude-controlled chrominance signal to substantially its original frequency band including oscillator means generating a frequency signal at a frequency equal to the desired subcarrier frequency of the modulated chrominance signal in the composite color video signal to be reproduced, frequency multiplier means multiplying said extracted pilot signal to a frequency equal to the control frequency of said frequency band of the frequency-converted chrominance signal, means producing a frequency signal having a frequency which is the result of the frequencies of said frequency signals from said oscillator means and said multiplier means, respectively, and frequency converting means receiving said amplitude-controlled chrominance signal and the last mentioned frequency signal to shift the frequency band of said amplitude-controlled chrominance signal by the extent of the difference of said last frequency signal from the control frequency of said frequency band of the frequency-converted chrominance signal, and means combining the demodulated luminance signal with the reconverted chrominance signal so as to reconstitute the composite color video signal therefrom.

18. A system according to claim 17, in which said frequency of the last frequency signal is the sum of said frequencies of the frequency signals from said oscillator means and said multiplier means.

19. A system for recording a composite color video signal consisting of a luminance signal and a modulated chrominance signal having its frequency band within that of the luminance signal, comprising means for extracting said luminance and chrominance signals from said composite signal, means for frequency modulating said luminance signal, means for frequency converting said chrominance signal to a frequency band juxtaposed to the lower limit of the frequency bandwidth of the frequency-modulated luminance signal, means for combining said frequency-modulated luminance signal with said frequency-converted chrominance signal to provide a single combined signal in which said frequency-converted chrominance signal has a level which is about 3 to 10 percent of the level of said frequency-modulated luminance signal, and means for magnetically recording said combined signal.

20. A system according to claim 19, in which said means for frequency converting the chrominance signal extracted from the composite color video signal includes means extracting a burst signal from said chrominance signal, first oscillator means locked by said first signal to produce a first frequency signal at a frequency which is an odd multiple of one-half the horizontal scanning frequency, second oscillator means producing a second frequency signal at a frequency which is also an odd multiple of one-half said horizontal scanning frequency, means combining said first and second frequency signals to provide a third frequency signal at a frequency which is the result of the frequencies of said first and second signals, and means to beat down said modulated chrominance signal extracted from the composite color video signal with said third frequency signal.

21. A system according to claim 20, in which said third frequency signal has a frequency which is the sum of said frequencies of the first and second frequency signals.

22. A system according to claim 21, in which said first frequency signal has a frequency substantially equal to that of the subcarriers of said chrominance signal and said second frequency signal has a frequency substantially lower than said frequency of the first frequency signal.